United States Patent Office 2,759,016
Patented Aug. 14, 1956

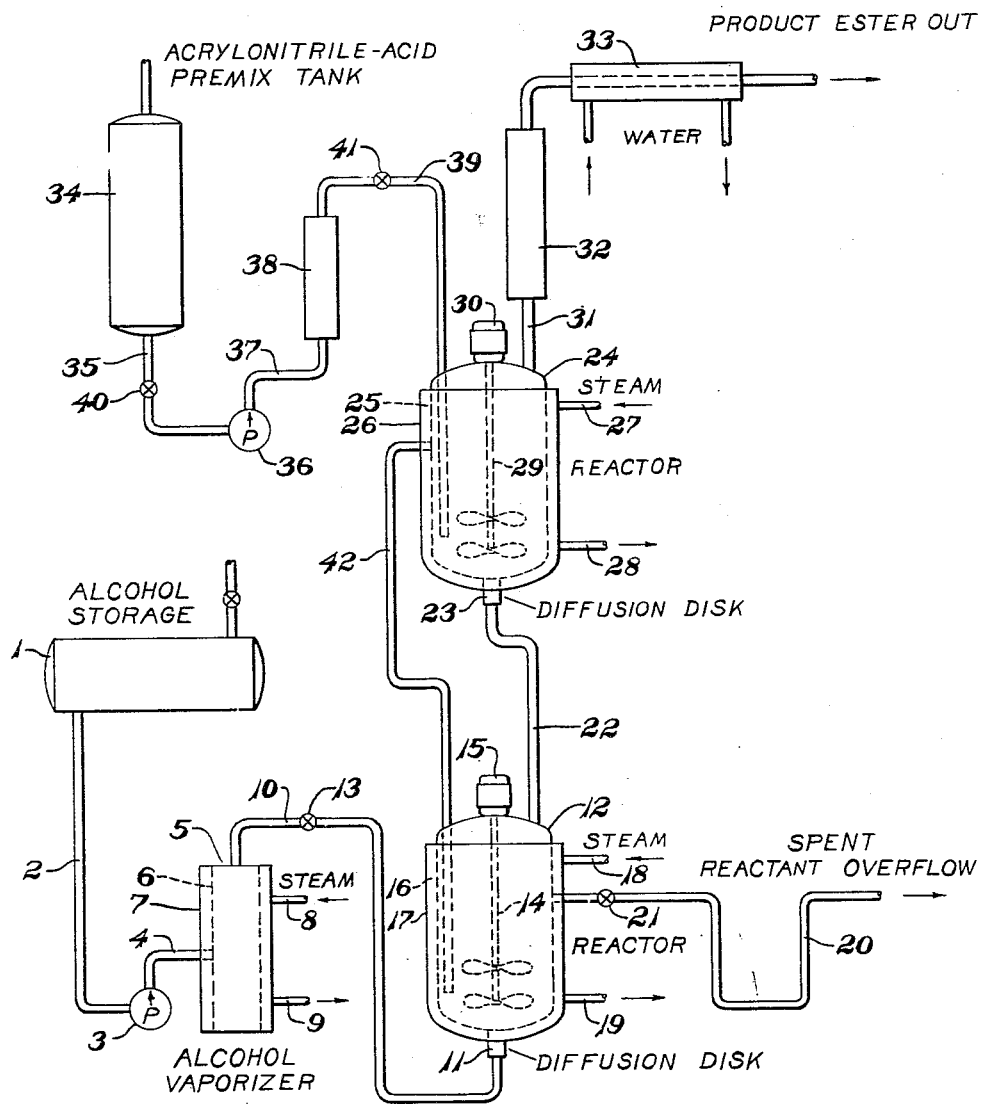

2,759,016

METHOD FOR PREPARING ALKYL ESTERS OF ACRYLIC ACID

Herbert G. Metzger, Lorain, Ohio, and Frederick J. Held, Jamesburg, N. J., assignors to The B. F. Goodrich Company, New York, N. Y., a corporation of New York Application February 20, 1953, Serial No. 338,034

12 Claims. (Cl. 260—486)

This invention relates to the preparation of alkyl esters of acrylic acid and pertains more particularly to an improved process for the preparation of such esters by the reaction of acrylonitrile, an alkanol and a strong mineral oxyacid. Still more specifically, this invention relates to a process whereby alkyl esters of acrylic acid are prepared continuously and in high yield.

The alkyl acrylates, particularly methyl acrylate and ethyl acrylate, are very important compounds from a commercial standpoint, being especially useful in the preparation of synthetic rubbers and resins. Accordingly, many processes for their production using readily available raw materials have been proposed in attempts to lower production costs and obtain the highest possible yields.

One of such methods is disclosed by Wiley et al. in U. S. Patent No. 2,526,310. According to the batch method described therein, acrylonitrile is progressively added to water containing a mineral acid to form an intermediate reaction product which, according to the patentees, is either acrylamide or acrylic acid, depending on the quantity of water utilized. For example, with about 1 mole of water per mole of acrylonitrile, acrylamide appears to be formed principally, and with higher ratios of water to acrylonitrile, acrylic acid is formed predominantly. The mineral acid is alleged to be a catalyst to promote the reaction of the acrylonitrile and water. The intermediate acrylonitrile derivative is then heated with methanol, ethanol or a propanol to give the corresponding alkyl acrylate.

A second method, also involving the use of acrylonitrile, an alkanol and an acid, but basically different from the process disclosed in the foregoing paragraph with regard to both reactant ratios and reaction conditions, is disclosed in a copending application of Charles E. Brockway, Serial No. 178,997, filed August 11, 1950, now issued as U. S. Patent 2,666,782.

There are several serious disadvantages to a two-stage batch type reaction such as is disclosed in the Wiley et al. patent. For example, acrylonitrile and its reaction products tend strongly to polymerize, and elevated temperatures and acidic conditions favor this polymerization. Accordingly, when large quantities of acrylonitrile, water and acid are brought together, as they necessarily are in a batch process, considerable polymerization of the acrylonitrile and the acrylonitrile reaction product takes place with attendant decrease in the yield of the desired acrylate ester. Further, as stated hereinabove, the acrylonitrile-water reaction mixture may contain a high concentration of acrylic acid which also polymerizes readily and is, therefore, not available for conversion to acrylate esters.

It is, therefore, an object of the present invention to provide a process for reacting acrylonitrile with an alkanol and acid to give extremely high yields of alkyl acrylates.

Another object of the invention is the provision of a process for reacting acrylonitrile, an alkanol and an acid in such a manner that high yields of alkyl acrylates are obtained and polymerization of the acrylonitrile and acrylonitrile reaction product is held to a bare minimum.

Another object of the invention is to provide a continuous process whereby acrylonitrile, an alkanol and an acid are reacted to yield continuously an alkyl acrylate, the reaction being carried out in such a manner that loss through polymerization and/or decomposition of the acrylonitrile intermediate reaction product is minimized.

We have discovered that the above and other objects are readily accomplished by diffusing vapors of an alkanol countercurrently through a heated mixture comprising the reaction product of acrylonitrile with a strong mineral oxyacid, the reaction being carried out in a series of two or more stages. By carrying out the process in this manner, it is possible to operate with concentrations or proportions of reactants just sufficient to insure an adequate rate of reaction, so that loss through polymerization and decomposition of the acrylonitrile and acrylonitrile reaction product, which necessarily attends the noncontinuous, batch reaction, is greatly minimized. A further advantage of this continuous process is that the acrylonitrile-oxyacid reaction mixture can be continuously made and used; it thus has a very short heat history, so that polymerization of the acrylonitrile and acrylonitrile derivatives is again reduced. Other advantages of the present continuous process over the prior art batch processes will be apparent from the description which follows.

The process of the present invention may be more easily described and understood by reference to the accompanying drawing which is a diagrammatic representation of one preferred method for carrying out the invention.

In this method of operation, an alkanol from storage tank 1, is passed through conduit 2, to a pump 3, which propels the liquid alcohol through pipe 4, into a vaporizer 5, which has inner and outer jackets or walls 6 and 7, respectively. Pump 3 is preferably one which can be controlled so as to supply metered amounts of alcohol into the vaporizer. A heat transfer fluid, such as steam and the like, is fed through pipes 8 and 9 and circulated between jackets 6 and 7 of the vaporizer.

After the alcohol reaches the boiling stage, the vapors are carried by pipe 10, through a diffusion disk 11 and into the bottom of a reactor or secondary reaction zone 12. The rate of flow of vapors can be controlled by a valve 13 in pipe line 10. The reactor 12 contains some acrylonitrile-oxyacid reaction mixture, together with some acrylic acid ester. The alcohol vapors react with the acrylonitrile-oxyacid mixture and also tend to strip the ester from the liquid in the reactor. In order to assure good contact of the alcohol vapor with acrylonitrile reaction product, the reactor 12 is supplied with a stirrer 14, driven by a motor 15. This stirrer and diffusion disk combine to provide efficient intermingling of the alcohol vapors with the acrylonitrile-oxyacid reaction product.

Reactor, or secondary reaction zone, 12 has an inner jacket or wall 16 and an outer jacket 17 between which a heat transfer medium may be circulated through leads 18 and 19. A spent reaction overflow 20 is throttled by valve 21 to maintain the liquid level in reactor 12 at a proper and substantially constant level, preferably slightly above the inlet of the overflow.

The temperature in reactor 12 is kept sufficiently high to maintain the alcohol in the vapor state and to evaporate any acrylate ester that is formed. Consequently, the alcohol and acrylate ester vapors pass from the reactor through line 22, and through a second diffusion disk 23 into the base of another reactor, or primary reaction zone, 24. The latter may have a structure that is similar to reactor 12, in that it has inner and outer jackets 25, 26, respectively, between which a heat transfer fluid may be circulated by way of pipes 27, 28. Reactor 24 also has a stirrer 29, driven by a motor 30. The temperature of the reaction mixture in this zone is also maintained above the boiling point of the alcohol and acrylate ester. Thus, the vapors of the latter materials pass through line 31 into a fractionating column 32 and into condenser 33 where the vapors are liquified and drawn off.

In the meantime, an acrylonitrile-oxyacid intermediate reaction product is fed continuously and in requisite quantities from pre-mix tank 34, through line 35, to pump 36, which propels the fluid through pipe 37, metering device 38, and pipe 39, into reactor 24. The feed rate of the acrylonitrile-oxyacid reaction mixture can be controlled by valves 40 and 41 or by pump 36. By this means, it is possible to regulate both the amount of alkanol and acrylonitrile intermediate reaction product to the proportions that are found to give the highest yield of acrylate ester under the reaction conditions employed.

The acrylonitrile-oxyacid mixture reacts with the unreacted alcohol entering through diffusion disk 23. The ester formed, together with unreacted alcohol passes into the fractionating column and condenser. The partially reacted acrylonitrile-oxyacid mixture overflows through pipe 42 and enters the lower portion of reactor 12, where it is further reacted with alcohol and stripped of the ester it contains, as hereinbefore described. This completes the cycle of operation and it is evident that the acrylonitrile-oxyacid reaction product and the acrylate esters are exposed to high heat for only a very limited time. It is obvious, also, that mixtures of alcohols can be reacted at the same time should a mixture of esters be desired.

In preparing acrylate esters in accordance with the process of the present invention, any alkanol may be utilized. Examples of such alkanols include methanol, ethanol, propanol, isopropanol, butanol, 2-ethyl-hexanol, n-octanol, 3,5,5-trimethyl hexanol-1 and the like. Especially preferred are those alkanols which contain from 1 to 2 carbon atoms, namely, methanol and ethanol, so that the preferred embodiments of the present invention involve the preparation of methyl acrylate and ethyl acrylate. Efficient contact of the alkanol vapors with the acrylonitrile reaction product is very important to the successful operation of the present process. As indicated hereinabove, such contact is readily obtained by passing the alkanol vapors through a diffusion disk, preferably constructed of sintered glass or other corrosion-resistant, finely-foraminous material which serves to diffuse the alkanol vapors into the acrylonitrile reaction product in such a manner that complete admixture of the two reactants is assured. Likewise, flow of the alcohol vapors countercurrently to the direction of flow of the acrylonitrile intermediate reaction product is highly important in obtaining extremely high yields of alkyl acrylates. In this manner, the alkanol can first be utilized to form an ester with the unreacted acrylonitrile derivative and to scrub the acrylate from the tailings in one reactor or secondary reaction zone (reactor 12 in the drawing) and then fed countercurrently through the initial reactor or primary reaction zone (reactor 24 in the drawing) where the alkanol serves to form additional ester and to strip the acrylate from the acrylonitrile intermediate reaction product. The use of the countercurrent flow of alkanol overcomes the serious disadvantage in the batch process wherein it has been found that the alkanol efficiency drops off rapidly toward the end of the reaction.

It is also important that the temperature of the acrylonitrile intermediate reaction product in each reactor be accurately controlled in order that polymerization can be minimized. For example, the initial reactor, having a high acrylonitrile-acid reaction product concentration should not be heated to a temperature above about 155° C.; at temperatures above this figure the acrylonitrile intermediate reaction product tends strongly to polymerization and to undergo side reactions. However, the initial or primary reactor 24, may be maintained at a temperature substantially lower than 155° C., for example, as low as 130° C. or even lower. The second reactor 12, is preferably maintained at temperatures of about 160° C. or 165° C.; such temperatures increase the efficiency of the scrubbing action in the second stage and are permitted since the acrylonitrile-acid reaction product content of the second stage is very low; hence polymerization of acrylonitrile or the acrylonitrile intermediate reaction product is not likely to occur even at higher temperatures. It is to be understood, however, that temperatures other than 160° C. or 165° C. can be utilized in the second reactor; for example, temperatures as low as 120° C. or lower or as high as 180° C. may be employed with good results. It is also to be understood that one or more additional reactors may be connected in series with the reactors shown in the drawing. For example, a third reactor maintained at a temperature above that of the second reactor increases to a slight degree the scrubbing efficiency of the alkanol. Also, since the temperature of the initial reactor determines to a large degree the amount of acrylic acid in the subsequent reactors, it is possible to decrease the acrylic acid content in the spent reaction product by maintaining the initial reactor at a lower temperature and providing an additional reactor in series with the second reactor for scrubbing purposes.

In preparing the acrylonitrile intermediate reaction mixture, the acrylonitrile is preferably added to the acid, since addition of the acid to the acrylonitrile is likely to produce a highly exothermic reaction which may be uncontrollable if extreme care is not exercised. The addition of the acrylonitrile also tends to cause an exothermic reaction to take place; however, with only a short period of exposure to heat, the reaction can be carried out at temperatures on the order of 80–140° C., and preferably at about 110° C. without appreciable polymerization. At about 155° C. the reaction mixture decomposes with loss of yield; therefore, lower temperatures, such as those described, are to be preferred. It is preferable that an excess of the mineral oxyacid be utilized, for example, from about 1.5 to 10 moles of oxyacid for each mole of acrylonitrile, with an especially preferred ratio being from 1.5 to 2.5 moles of acid for each mole of acrylonitrile.

Any strong mineral oxyacid such as sulfuric acid, phosphoric acid and the like may be employed in the preparation of the intermediate product, sulfuric acid being especially preferred, since highest yields of acrylates are secured by its use. The acid is preferably utilized in a concentration of 50 to 95% and especially in a concentration of 75 to 90%.

It is also desirable that the acrylonitrile intermediate reaction mixture contain a polymerization inhibitor. Suitable compounds for this purpose include hydroquinone, phenyl-beta-napthylamine, tertiary butyl catechol, picric acid and the like. It is further desirable that this reaction mixture be used as fast as possible after its preparation since lower yields of acrylate esters result when there is too long an interval between the preparation and utilization.

During the course of the reaction, a small amount of a dialkyl ether is formed. When small amounts of this ether are recycled by addition to the alkanol, no effect on the conversion to acrylate esters is apparent but the amount of additional ether formed is materially reduced. We have found that addition of water to the alkanol, such as going from 95% alkanol to 80% alkanol, results not only in increased yield of the acrylic acid esters but also in substantial reduction in the amount of the dialkyl ether formed.

The ratio of alkanol to acrylonitrile-oxyacid reaction product must be at least 1 to 1, but there appears to be no top limit to the amount of alcohol that may be used in the esterification reaction. It has been discovered, however, that there is little or no advantage in using more than 5 moles of alcohol for each mole of acrylonitrile-oxyacid reaction product. Nevertheless, an excess of alkanol over the stoichiometric quantity required is desirable in that higher yields of ester result. In the best mode of practicing this invention, the alkanol is preferably blended with water, so that a mixture of alcohol and water vapors enter the acrylonitrile-oxyacid reaction product. This can be effected by blending separately formed alcohol vapor with water vapors, or, in the case of water-soluble alcohols, the water may be added to the alcohol and the aqueous solution is vaporized. The best yields were obtained by passing vapors containing from about 75% to about 85% alcohol and from about 15% to 25% water into the reaction zone. The preferred ratio of the water-containing alcohol is from about 1.75 to about 3.5 moles of such alcohol for each mole of acrylonitrile-oxyacid reaction product.

Because of the corrosive nature of the nitrile-acid intermediate product, it is preferred that the process of this invention be carried out in a reactor made from a material which is substantially non-corrosive. Among the materials which are particularly satisfactory are included glass, ceramics, metals coated with certain enamels, carbon, resin bonded carbons, polytetrafluoroethylenes and the like.

The following examples are intended to illustrate more fully the preparation of alkyl acrylates according to the method of this invention, but are not to be construed as a limitation upon the scope thereof, for there are, of course, numerous possible variations and modifications.

*Example 1*

A reaction product of acrylonitrile in sulfuric acid was prepared by adding 36 parts (2 moles) of water to 200 parts (2 moles) of 95% sulfuric acid containing 3 parts of hydroquinone. 53 parts (1 mole) of acrylonitrile were then added slowly with stirring. This reaction mixture was then metered from acrylonitrile-acid premix tank 34 into reactor 24. 80% ethyl alcohol from alcohol storage tank 1 was vaporized and diffused into the reaction mixture contained in reactor 12 as described hereinabove, at a rate such that there were 2.27 moles of ethyl alcohol per mole of acrylonitrile. The temperature of each reactor was maintained between 150° C. and 155° C. A 94.5% yield of substantially pure ethyl acrylate was obtained.

*Example 2*

An intermediate reaction product of acrylonitrile and sulfuric acid was prepared as in Example 1. Vapors of 80% ethanol were then metered into reactor 12 at the rate of 2.08 moles of ethanol per mole of acrylonitrile. A temperature of 150° C. to 155° C. was maintained in each reactor. Ethyl acrylate was obtained in 95% yield.

*Example 3*

Example 1 was repeated except that methanol was utilized instead of ethanol. A 96% yield of methyl acrylate was obtained.

Similarly, when other alkanols selected from those disclosed hereinabove are substituted for methanol or ethanol in the above examples, substantial yields of alkyl acrylates are obtained. Other mineral oxyacids, such as phosphoric, may be substituted for the sulfuric acid of the example. Good results are also achieved by maintaining the reactors at temperatures other than those utilized in the specific examples.

Numerous variations and modifications will be apparent to those skilled in the art and are included within the spirit and scope of the invention as defined in the appended claims.

We claim:
1. The method of preparing lower alkyl acrylate esters comprising, preparing, in the presence of a polymerization inhibitor, a mixture of acrylonitrile and a mineral oxyacid having an acid content of from about 75% to about 90% and being present in quantities of from about 1.5 to about 2.5 moles for each mole of acrylonitrile without external heating, continuously feeding said mixture into a primary reaction zone of a plurality of connecting reaction zones, heating and maintaining said mixture at a temperature between about 130° C. and 155° C. in said primary reaction zone and a temperature between about 120° C. and 180° C. in subsequent reaction zones, continuously vaporizing a lower monohydric alkanol and continuously bringing together said alkanol and said mixture in a molar ratio of at least 1 to 1 by feeding said alkanol vapors into said reaction zones in a direction counter-current to the flow of said mixture.

2. The method of claim 1 in which the alkanol is methanol.

3. The method of claim 1 in which the alkanol is ethanol.

4. The method of preparing lower alkyl acrylate esters comprising, preparing, in the presence of a polymerization inhibitor, a mixture of acrylonitrile and sulfuric acid having an acid content of from about 50% to about 95% and being present in quantities of from about 1.5 to about 2.5 moles for each mole of acrylonitrile without external heating, continuously feeding said mixture into a primary reaction zone, heating said mixture to a temperature between about 130° C. and 155° C. in said primary zone, passing said mixture from said primary zone to a secondary reaction zone, maintaining the temperature of the mixture between about 120° C. and 180° C. in said secondary zone, continuously vaporizing a lower monohydric alkanol and continuously bringing together said alkanol vapors with said mixture in each reaction zone countercurrently to the flow of said mixture.

5. The method of claim 4 in which the sulfuric acid has an acid content of from about 75% to about 90%.

6. The method of claim 4 in which the alkanol is methanol.

7. The method of claim 4 in which the alkanol is ethanol.

8. The method of preparing lower alkyl acrylate esters comprising, preparing, in the presence of a polymerization inhibitor, a mixture of acrylonitrile and sulfuric acid having an acid content of from about 75% to about 90% and being present in quantities of from about 1.5 to about 3.5 moles for each mole of acrylonitrile, said mixture being prepared without addition of external heat, continuously feeding said mixture into a primary reaction zone, adjusting the temperature of said mixture between about 130° and 155° C. in said primary zone, passing said mixture from said primary zone to a connecting secondary reaction zone wherein a temperature of from about 135° C. to about 160° C. is maintained, and continuously bringing together with said mixture in each reaction zone a blend of vapors containing from about 15% to about 25% water and from about 75% to 85% of a lower monohydric alkanol having a boiling point up to about 155° C., said alkanol vapors being fed into the reaction system at the rate of about 1.75 to 3.5 moles for each mole of acrylonitrile.

9. The method of claim 8 in which the alkanol is methanol.

10. The method of claim 8 in which the alkanol is ethanol.

11. The method of claim 9 in which the molar ratio of methanol ranges from about 1.75 to about 3.5 for each mole of acrylonitrile-oxyacid mixture.

12. The method of claim 10 in which the molar ratio of ethanol ranges from about 1.75 to about 3.5 for each mole of acrylonitrile-oxyacid mixture.

References Cited in the file of this patent
UNITED STATES PATENTS

| | | |
|---|---|---|
| 2,175,810 | Loder | Oct. 10, 1939 |
| 2,416,746 | Jilk | Mar. 4, 1947 |
| 2,526,310 | Wiley et al. | Oct. 17, 1950 |
| 2,649,475 | Bellringer et al. | Aug. 18, 1953 |